Aug. 25, 1964     C. L. SPORCK     3,145,677

SHEET METAL WORKING

Original Filed June 30, 1959     5 Sheets-Sheet 1

INVENTOR
CLAUS L. SPORCK

ATTORNEYS

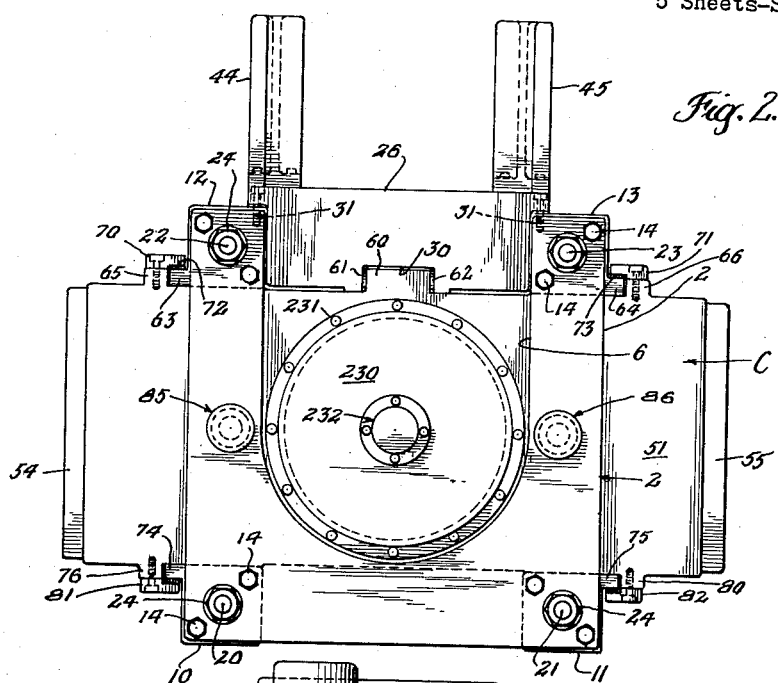
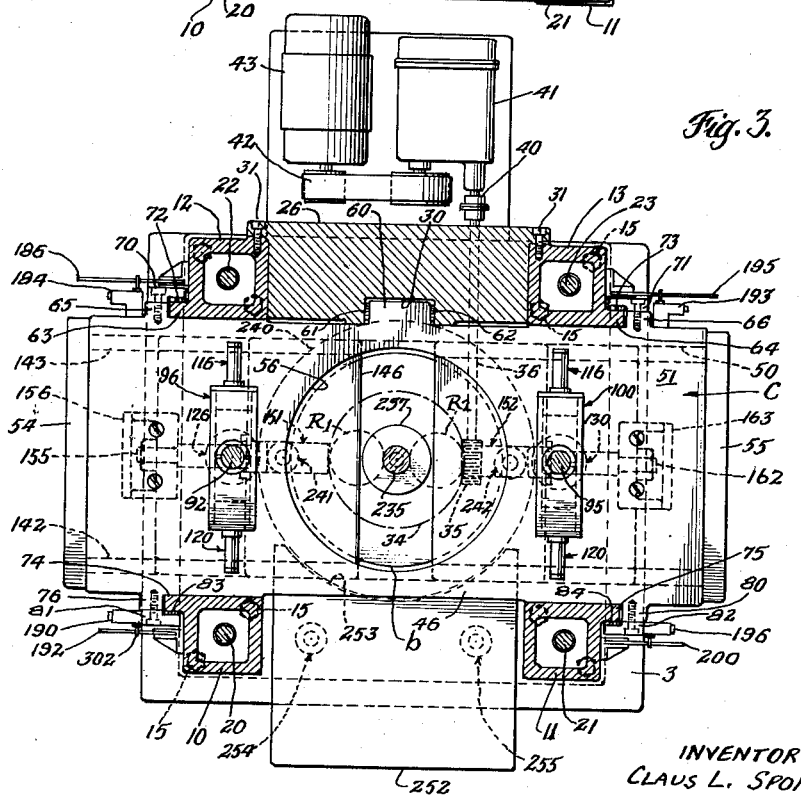

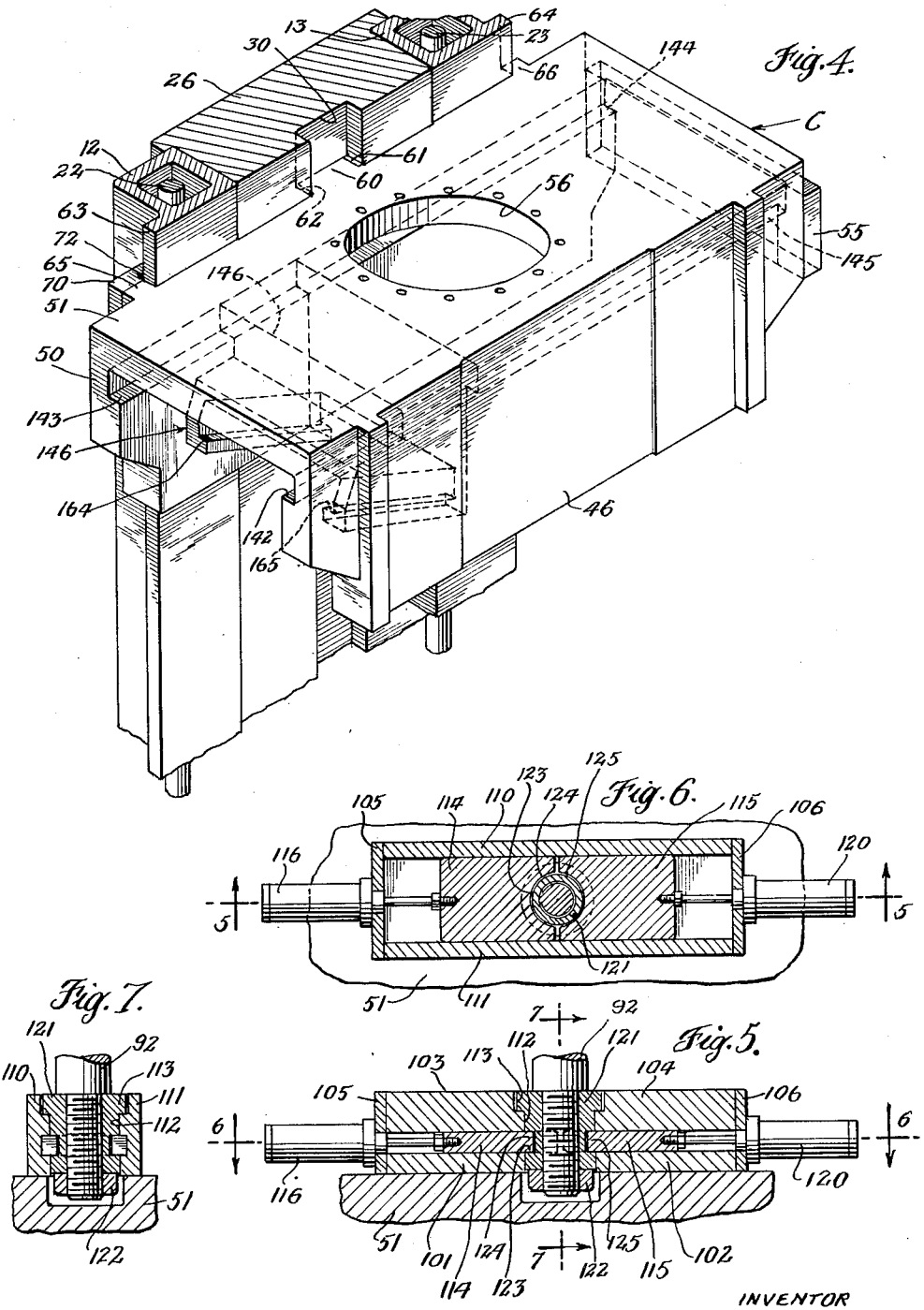

Aug. 25, 1964  C. L. SPORCK  3,145,677
SHEET METAL WORKING
Original Filed June 30, 1959  5 Sheets-Sheet 4
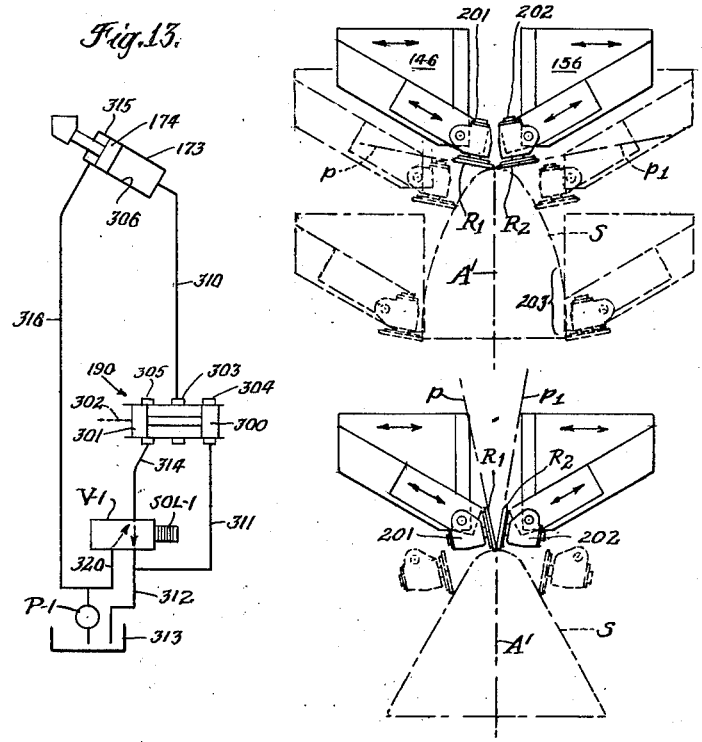
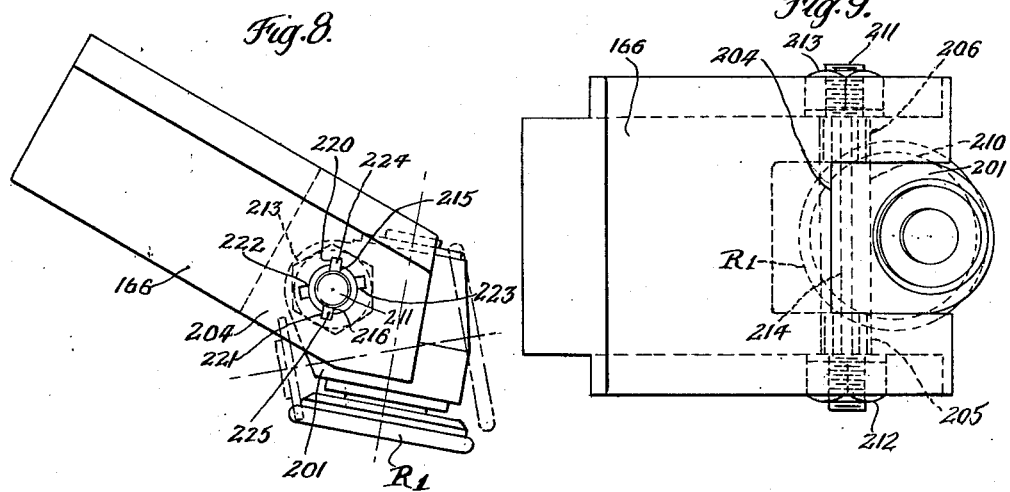
INVENTOR
CLAUS L. SPORCK
Synnestvedt + Lechner
ATTORNEYS

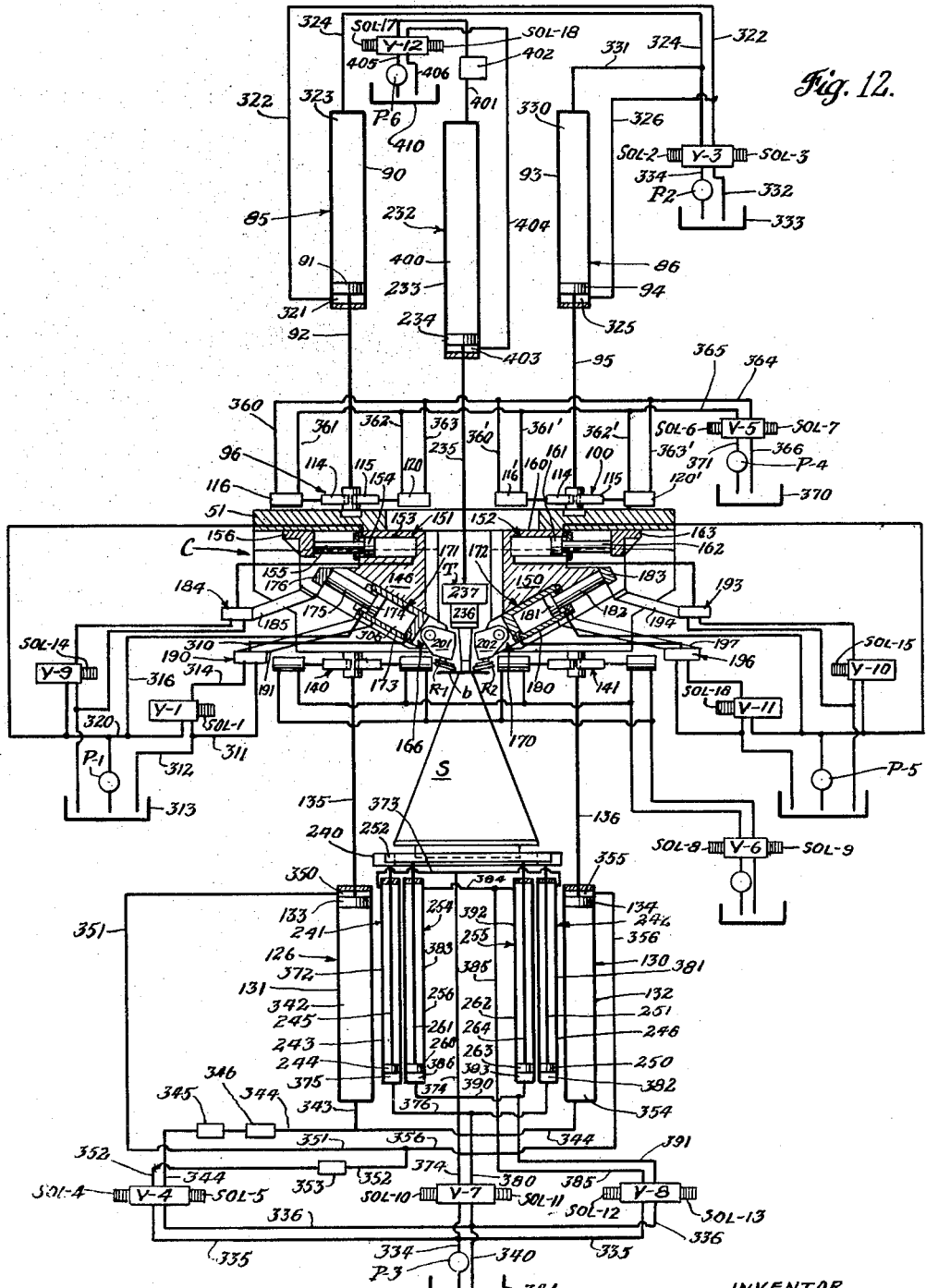

United States Patent Office 3,145,677
Patented Aug. 25, 1964

3,145,677
SHEET METAL WORKING
Claus L. Sporck, Cincinnati, Ohio, assignor to The Lodge & Shipley Company, Inc., Cincinnati, Ohio, a corporation of Ohio
Continuation of application Ser. No. 823,984, June 30, 1959. This application Aug. 15, 1963, Ser. No. 303,471
19 Claims. (Cl. 113—52)

This invention relates to the art of metal working and in particular relates to apparatus for forming hollow articles from sheet metal blanks, and is a continuation of my copending application Serial No. 823,984, filed June 30, 1959, now abandoned.

The term "hollow" as used herein will be understood to apply to a formed article which is frusto-conical in shape, for example, an article similar in shape to a megaphone, and is also meant to include an article which has a hemispherical shape such as a bowl, or to an article in the shape of a horn and also to an article which is generally tubular or cylindrical in shape.

In general the apparatus of the invention relates to machine tools such as shown in copending applications 679,551, now U.S. Patent No. 3,104,640 granted September 24, 1963, and 765,878, for the cold working or flowing of sheet metal blanks by the use of a roller or rollers cooperating with a contoured tool or spindle, such working being commonly known in the art as roll flowing and/or power spinning.

Certain of the physical embodiments of the concepts disclosed in the above-mentioned copending applications are employed in the apparatus of the present invention and in one aspect the invention contemplates certain substantial improvements in the structure and/or embodiments of such concepts. Further, the present invention contemplates certain new and novel concepts and embodiments thereof and new and useful cooperative action between such new embodiments and between such improved structures.

One object of the invention is to provide a machine tool having a frame comprising a base and a crown interconnected by square columns, the square columns providing a maximum resistance to torque generated by the flowing operation.

Another object of the invention is to provide a machine tool having a frame comprising a base and a crown interconnected by square colums, the square columns providing a deflection-free mounting surface for mounting tracer templates.

Another object of the invention is to provide a machine tool having a frame comprising a base and a crown interconnected by square columns and by tie rods, the square columns providing a maximum resistance to torque generated by the flowing operation and the tie rods providing a maximum resistance to axial thrust generated by the flowing operation.

Another object of the invention is to provide a machine tool having a frame comprising a base and a crown interconnected by torque-resisting square columns and a torque-resisting intermediate structural member interconnecting two of the columns, the columns and intermediate member having guiding surfaces for directing the roller-mounting carriage along the desired path.

Another object of the invention is to provide in a machine tool a roller-mounting carriage which supports a tailstock for clamping the blank during the working operation and the tailstock being demountable from the carriage in certain cases where the machine is used for working cylindrically-shaped blanks.

Another object of the invention is to provide a machine tool having a frame supporting a roller-mounting carriage, the carriage also supporting a yieldable and demountable tailstock with the end of the frame having an opening which allows for motion of the tailstock at certain times during the operating cycle, for removal of the tailstock therethrough and to allow for the expansion of cylindrically-shaped blanks when the same are worked on the machine.

Another object of the invention is to provide a machine tool having a frame mounting a roller-supporting carriage, the carriage also supporting a demountable tailstock and the frame having a platform for mounting the tailstock when the same is removed from the carriage.

Another object of the invention is to provide structure for mounting a roller which supports the roller with substantially the same minimum overhang regardless of the radial position of the roller and with minimum strain in the structure.

Another object of the invention is to provide in a machine tool for the supporting of a roller or tool by means of two slides, one slide being mounted on the other and both slides being mounted on a common carriage and having independently and cooperatively controlled motions in directions toward and away from the rotational axis of the work piece during the working operation.

Another object of the invention is to provide in a machine tool for the supporting of a roller or tool by means of a pair of slides both mounted on a carriage, the slide carrying the roller or tool being movable along an axis which is oriented at an acute angle to the rotational axis of the work piece and the acute angle slide being in turn mounted on a slide which is movable along an axis oriented at a 90° angle to the work piece axis, both slides being automatically controlled during the working operation.

Another object of the invention is to provide means for mounting a roller which comprises a slide carrying the roller and movable along an axis oriented at 60° to the work piece axis and the 60° slide being mounted on another slide which is movable along an axis oriented at 90° to the work piece axis, the 90° slide being mounted on a carriage and with both the 60° and 90° slides being controlled by independently operating tracer mechanisms.

Another object of the invention is to provide in a machine tool for the guiding of a tool or roller over a work piece by a carriage which imparts a component of motion to the roller in a direction along the axis of the work piece and a pair of slides mounted on the carriage to impart components of motion to the roller in directions transverse the axis of the work piece.

Another object of the invention is to provide in a machine tool for improved tracer control of a roller or tool by means of two slides commonly connected to each other and to a carriage and each slide being independently and automatically controlled.

Another object of the invention is to provide in a machine tool for the driving of a roller-supporting carriage by means of two alternatively operable hydraulic motor systems, one motor being for moving the carriage before and after the working operation and the other being for moving the carriage during the working operation.

Another object of the invention is to provide in a machine tool mechanism for driving a tool or roller-supporting carriage comprising a pair of independently operative fluid-operated devices, one pair moving the carriage to and from its position at the start of the working operation and the other moving the carriage during the working operation.

Another object of the invention is to provide in a machine tool having a roller or tool-supporting carriage improvements in mechanism for driving the carriage, the mechanism being of the type having a driving member in tension.

Another object of the invention is to provide in a machine tool a base or headstock for rotatably mounting a spindle or mandrel together with a roller or tool-supporting carriage and improved means for driving the carriage during the working operation comprising hydraulic piston and cylinder devices interconnected between the carriage and the headstock and adapted to pull the carriage toward the headstock during the working operation.

Another object of the invention is to provide in a machine tool a headstock rotatably mounting a spindle or mandrel together with a roller-supporting carriage, the carriage being movable during the working operation by piston and cylinder means interconnected between the carriage and the headstock and arranged so that the resultant moving force acts along the rotational axis of the spindle.

Another object of the invention is to provide in a machine tool a headstock rotatably mounting a mandrel or spindle together with a roller-supporting carriage and improved means moving the carriage during the working operation comprising a pair of pistons and cylinders disposed on opposite sides of the axis of the mandrel and the axes of which lie in a plane containing the rotational axis of the spindle.

Another object of the invention is to provide in a machine tool a frame including a pair of supports disposed at opposite ends of the frame, one of the supports rotatably mounting a mandrel or spindle together with a carriage disposed intermediate the supports and movable back and forth along the rotational axis of the spindle, and means for moving the carriage including piston and cylinder means on one support which are lockable with the carriage for moving the same during the working operation and piston and cylinder means on the other support which are lockable with the carriage for moving the same at times other than during the working operation.

Another object of the invention is to provide in a machine tool a frame including first and second supports disposed at opposite ends of the frame, one support rotatably mounting a spindle together with a carriage disposed intermediate the supports and mounted for back and forth movement along the axis of the spindle, together with means for mounting the carriage comprising a pair of pistons on the first support and a pair of pistons on the second support, the pistons on the first support being engageable and lockable with the carriage to move the same toward and away from the starting point of the working operation and the pistons on the second support being engageable and lockable with the carriage to move the same during the working operation being disengaged with the carriage during the working operation.

Another object of the invention is to provide in a machine tool a headstock rotatably mounting a spindle for supporting a blank during a working operation together with stripper mechanism to strip a worked blank from the spindle and elevator mechanism cooperating with the stripper mechanism to provide a means for supporting a blank to be loaded on the spindle.

Another object of the invention is to provide in a machine tool improvements in means for positioning a roller so that the face of the roller can be positioned substantially at 90° or substantially parallel to the rotational axis of the work piece.

A typical embodiment of the invention will be described below taken in conjunction with the drawings wherein:

FIGURE 2 is a plan view of FIGURE 1;

FIGURE 3 is a plan section on the line 3—3 of FIGURE 1;

FIGURE 4 is an isometric view of the carriage of the machine and certain connected parts;

FIGURE 5 is an enlarged section on the line 5—5 of FIGURE 6 illustrating a locking device;

FIGURE 6 is a plan section on the line 6—6 of FIGURE 5;

FIGURE 7 is a cross section on the line 7—7 of FIGURE 5;

FIGURE 8 is an enlarged elevational view of one of the rollers and its slide;

FIGURE 9 is a plan view of FIGURE 8;

FIGURE 10 is a diagrammatic view illustrating the relative positions of the 60° and 90° slides during a working operation;

FIGURE 11 is a view similar to FIGURE 10 but showing the face of the roller in a different position;

FIGURE 12 is a diagrammatic hydraulic diagram; and

FIGURE 13 is a diagrammatic view of the tracer system employed with the 60°–90° slides.

Figure 1:
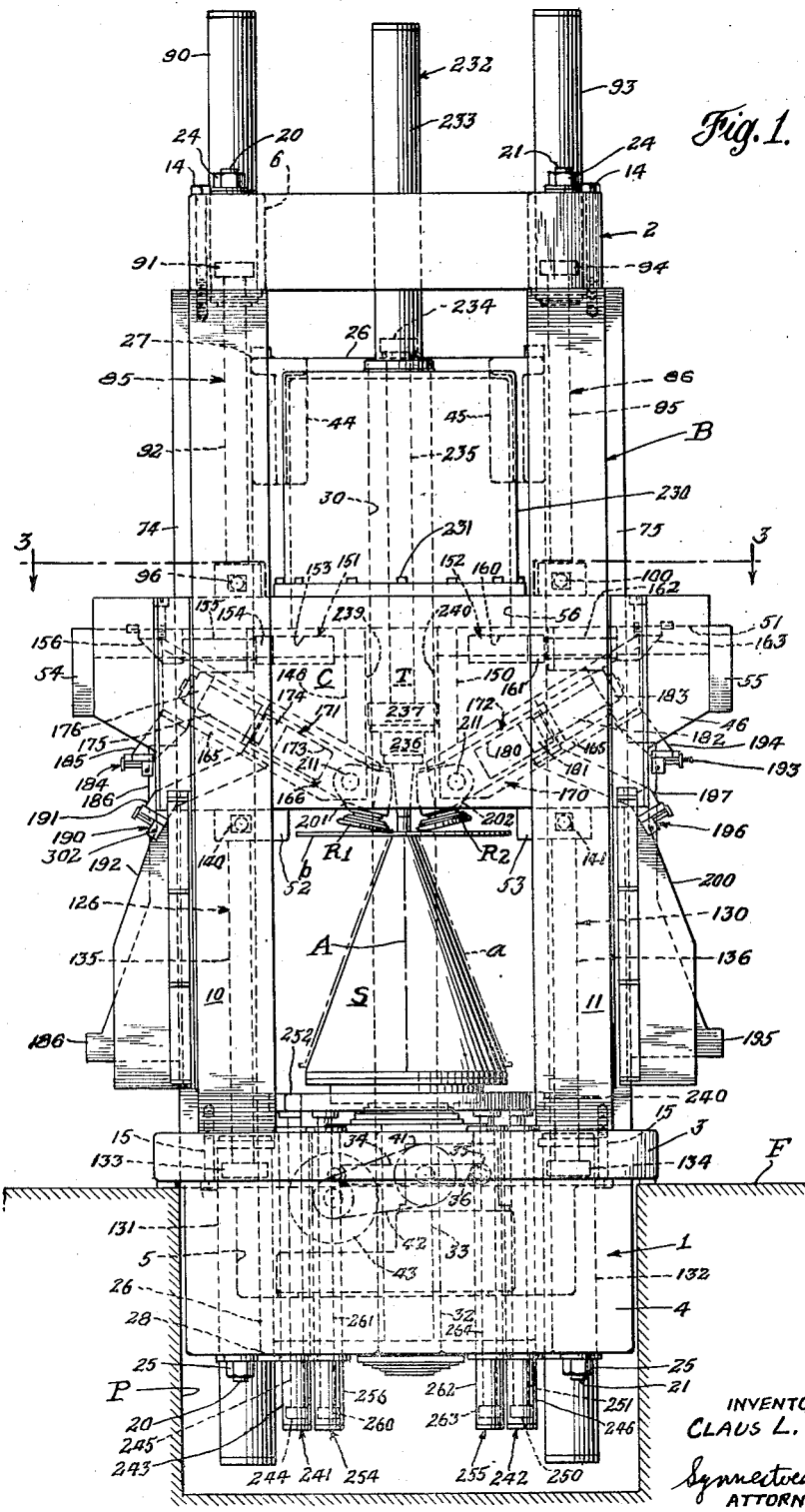
FIGURE 1 is a front elevational view of apparatus constructed in accordance with the invention.

Referring to the drawings, particularly FIGURE 1, the machine in general comprises a vertically-extending frame or bed B disposed on the floor F; a mandrel or spindle S rotatably mounted on the frame; a carriage C mounted on the frame and arranged to be moved in a direction generally along the axis A of the spindle; rollers $R_1$ and $R_2$ mounted on the carriage and each arranged to be moved in a direction generally transverse the rotational axis of the spindle; a tailstock assembly T mounted on the carriage and adapted to support a blank $b$ on the spindle S. During the working operation the rollers $R_1$ and $R_2$ engage the blank $b$ and work the same into the finished article $a$ which in the present instance is shown to be conical.

The Bed or Frame

The function of the bed is to form a support for the rotatable spindle and for the carriage with its interconnected elements, etc. The bed is of a design to readily absorb the thrusts or forces involved in the working operation with a minimum, if any, distortion.

The bed or frame has two end supports 1 and 2. The support 1 serves as a headstock or base and has a top part 3 and a bottom part 4. The top part 3 overhangs the bottom part 4 except at the rear. The part 3 is disposed above the floor F, while the part 4 is disposed within the pit P. In general the end support 1 is a large box-like casting which has a hollowed-out center section 5 provided with internal strengthening webs (not shown). The end support or crown 2 is also a large hollow casting provided with internal strengthening webs or ribs (not shown). Both the crown and base have supporting structures for certain cylinders, bearings, etc., as will be apparent later. As best seen in FIGURE 2, the crown is U-shaped in plan which provides a U-shaped opening or aperture 6. Interconnecting the base and crown are four square columns 10, 11, 12 and 13. The upper and lower ends of each column are screwed to the crown and base, for example (see FIGURES 1 and 2), the screws 14 pass through the crown and are secured in the top end of the column 10. The lower ends of the columns are similarly secured. For example, with reference to FIGURES 1 and 3, it will be seen that the screws 15 pass through the part 3 of the base and are secured in the lower end of the column 10. The other columns are similarly secured to the base and crown.

With reference to FIGURE 3, it will be seen that each of the columns 10, 11, 12 and 13 are hollow and within each column are the tie rods 20, 21, 22 and 23. These tie rods extend through the columns and also through the base and crown and the upper and lower ends of the tie rods have nuts 24 and 25. When the nuts 24 and 25 are tightened down, the base and crown are pulled into tight engagement with the columns.

The purpose of the tie rods is to resist thrusts acting in a direction along the axis A and the purpose of the square columns is to resist torques acting in a direction around the axis A. The tie rods and square columns are an important part of the invention. I have discovered that round steel columns used as tie-in members in machines of the kind in question are not desirable, particularly under conditions of high horsepower and high torque. The reason is that round steel columns have a tendency to vibrate and also to deflect, particularly under high torque loads. Under such conditions, of course, dimensional accuracy in the forming of blanks is virtually impossible. I have found that the square columns provide torque resisting and vibration resisting characteristics. The tie rods take the major portion of any axial thrusts and leave the square columns relatively unloaded insofar as axial thrusts are concerned and, therefore, the square columns have a maximum capability of resisting torque and vibration.

Between the columns 12 and 13 there is an intermediate structural member 26. As best indicated in FIGURE 1, the member 26 extends from a point 27 just below the crown 2 down through to the base 1. The rear part of the base has a well and the member 26 extends down through the well and abuts the bottom of the well as indicated at 28. The member 26 has a centrally disposed slot 30 which extends throughout its vertical length. As best indicated in FIGURE 3, the member 26 is tied to the columns 12 and 13 and base 1 by the screws 31. The screws are disposed at desired intervals through out the vertical length of the member 26. As indicated in FIGURE 1, the base 1 has a vertically-extending integral key 32 which fits into the lower part of the slot 30 of the member 26. The mating surfaces of the key and slot are accurately machined so that when the intermediate member 26 is disposed in position, the engaging surfaces provide for stability of the member 26.

The function of the spindle or mandrel S is to support the blank to be worked by the rollers. The spindle may have a contoured surface such as the cone shape shown in FIGURE 1 or the elliptical shape shown in FIGURE 10 or some other desired contour.

The spindle S is rotatably mounted on the base 1, the shaft 33 of the spindle being supported by appropriate bearings (not shown) mounted in the base. The spindle is rotated by means of a worm wheel 34 which is secured to the shaft 33 and meshes with a worm 35 supported on a shaft 36 which is rotatably supported by bearings (not shown) in the base. The shaft 36 (see FIGURE 3) is connected by a coupling 40 to a gear box 41 which in turn is connected by the pulley-belt arrangement 42 to an electric motor 43. The gear box 41 may be of conventional form and arranged to drive the shaft 36, hence the spindle, at desired selected speeds.

The intermediate structural member 26 has two brackets 44 and 45 secured to the upper end thereof. These brackets serve as a means for storing the tailstock when it is removed from the carriage in a manner which will be explained hereinafter.

*The Carriage*

The carriage serves the basic function of supporting the rollers and roller slides and provides for the rollers, during the working operation, a component of motion in a direction generally along the spindle axis. The basic carriage structure per se is somewhat along the lines of that disclosed in my copending application 765,878.

As seen in FIGURE 4, the carriage has two generally triangular-shaped plates 46 and 50 which are interconnected at the top by means of a plate 51, on the bottom by means of tie-in brackets 52 and 53 (see FIGURE 1) and on each end by end plates 54 and 55. The top plate 51 is provided with an aperture 56 which is substantially coaxial with the spindle axis A.

The carriage is guided in its vertical motion by the columns 12 and 13 and the intermediate member 26 as explained following. The plate 50 of the carriage has a vertically-extending key 60 which fits into the slot or way 30 of the member 26. On the key 60 are wear plates 61 and 62 which interengage with the sides of the slot 30. The wear plates 61 and 62 extend throughout the vertical length of the key 60. As best indicated in FIGURE 3, the columns 12 and 13 have shoulders 63 and 64. The plate 50 of the carriage has shoulders 65 and 66 respectively adjacent the shoulders 63 and 64. On the shoulders 65 and 66 are the gibs 70 and 71 which have wear plates 72 and 73 abutting the shoulders 63 and 64. The wear plates 61 and 62, cooperating with the machined sides of the slot 30, provide for lateral guiding stability (left and right as viewed in FIGURE 1). The column 10 has a shoulder 74 and the column 11 has a shoulder 75. The plate 46 has shoulders 76 and 80 adjacent the shoulders 74 and 75 and carrying the gibs 81 and 82 which have wear plates 83 and 84 abutting the shoulders 74 and 75. The gibs 70, 71, 81 and 82 (and their respective wear plates) cooperating with the shoulders on the columns provide for fore and after guiding stability of the carriage.

As mentioned heretofore, the columns 12–13 and the intermediate structural member 26 are for all practical purposes deflection free, even with the high torques involved in the flowing operation. Thus, the locus of the carriage motion is a straight line and this is important from the standpoint of obtaining dimensional accuracy in the wall of an article being formed. It will be noted that the carriage structure is symmetrically disposed about the rotational axis of the spindle.

*Carriage Drive*

The basic function of the carriage drive is to move the carriage during the working operation and after completion of the same to move the carriage away from the spindle so that the formed blank or article can be taken off and another blank loaded. In copending application 679,551 there is disclosed a carriage drive which embodies the concept of driving the carriage by means of a member in tension. In particular, that application shows a lead screw, one end of which is fixed to the headstock and, for moving the carriage during the working operation, the screw is held non-rotatable and a nut on the carriage rotates about the screw. In effecting the carriage drive during the working operation the screw is put in tension. This tension member type of drive has several advantages, particularly from the standpoint of reducing, minimizing or eliminating carriage and/or roller vibration. The present invention makes certain improvements in this type of drive, particularly from the standpoint of simplicity, location of load or thrust vectors and increased load capacity.

Further, the carriage drive of the present invention contemplates that the drive be fluid actuated and comprise two independent parts. One part moves the carriage to and from its position at the start of the working operation (position shown in FIGURE 1) and the other part moves the carriage from the start and through the working operation and thence back to the start position when the working operation is completed. This has several advantages. For example, it permits the fluid-operated devices (pistons and cylinders) to be of much shorter length than when the whole carriage movement is made by a single driving member or piston and cylinder. This contributes to accuracy since it reduces the possibility of distortion of the pistons and cylinders and minimizes the effects of compressibility.

In the two-part carriage drive disclosed herein, the carriage is pulled (by piston rods in tension) along the spindle axis during the working operation. The two-part drive in cooperation with the pulling feature gives a substantial advantage, particularly in horizontal machines as it eliminates the necessity of tie rods between headstock and tailstock and also provides for substantial free space for loading and unloading blanks.

For moving the carriage up to the position it occupies at the start of the working operation (as shown in FIGURE 1) the invention contemplates a pair of independently operable piston and cylinder devices 85 and 86 which are symmetrically disposed on opposite sides of the spindle axis and lie in a plane containing this axis. This is important from the standpoint of causing working thrusts to lie along the spindle axis. The piston and cylinder device 85 includes a cylinder 90 which is fixed to the crown 2 and a piston 91 disposed within the cylinder and having a rod 92 secured thereto and extending downwardly toward the carriage. The piston and cylinder device 86 includes a cylinder 93 fixed to the crown within which is a piston 94 having a rod 95 which extends downwardly toward the carriage. The rods 92 and 95 are adapted to be interlocked with the carriage by means of the locking devices 96 and 100 fixedly mounted on the top plate 50. The two locking devices 96 and 100 are identical in construction and this construction will be explained in connection with FIGURES 5, 6 and 7.

On the top plate 51 there are fixedly secured two lower blocks 101 and 102. Just above the lower blocks are the upper blocks 103 and 104. The blocks are tied together by the end plates 105 and 106 and the side plates 110 and 111. The upper and lower blocks are configured to provide a central aperture 112 having an enlarged shoulder 113. Between the upper and lower blocks are the lock members 114 and 115 which are adapted to be movable toward and away from the aperture 112. The lock 114 is moved by the piston and cylinder device 116 and the lock 115 is moved by the piston and cylinder device 120. The ends of the piston rods 92 and 95 are provided with bushings, for example, bushing 121. The bushing is held on the rod by the nut 122. It will be observed that the bushing is contoured so that one part fits into the shoulder 113 and the central part fits into the aperture 112. The central part of the bushing has an annular groove 123. In the position of the parts shown the contoured ends 124 and 125 of the locks 114 and 115 engage and fit into the groove 123. As will be apparent, with this position the rods are firmly interengaged and locked with the carriage. For unlocking the carriage and rods, the locks 114 and 115 are moved away from and out of the shoulder 123 by the piston and cylinder devices 116 and 120.

The manner in which the piston and cylinder devices 116 and 120 are activated for locking and unlocking the carriage and rods and the manner in which the piston and cylinder devices 85 and 86 are activated to move the carriage will be explained later.

In FIGURE 1 the carriage is shown in the position just at the start of the working operation and for moving the carriage during the working operation the invention contemplates a pair of piston and cylinder devices 126 and 130. The devices 126 and 130 are symmetrically disposed about the spindle axis and lie in a plane containing this axis. The piston and cylinder device 126 includes a cylinder 131. The piston and cylinder device 130 has a similar cylinder 132. The cylinders 131 and 132 are fixed in the base 1. Within the cylinder 131 there is a piston 133 and within the cylinder 132 there is a piston 134. A piston rod 135 is secured to the piston 133 and extends upwardly toward the carriage. A similar piston rod 136 is secured to the piston 134.

The rods 135 and 136 are fixedly connected with the carriage during the working operation by means of the locking devices 140 and 141 which are respectively mounted on the tie-in brackets 52 and 53.

The locking devices 140 and 141 are identical in construction to the locking devices explained in connection with FIGURES 5–7. The manner in which the locking devices 140 and 141 are activated to lock and unlock the carriage and the rods 135 and 136 and the manner in which the piston and cylinder devices 126 and 130 are activated to move the carriage will be explained hereinafter.

*Roller Slides*

The basic function of the roller slides is to mount the rollers $R_1$ and $R_2$ and to impart to the rollers components of motion which are in directions generally transverse the rotational axis of the spindle.

As best seen in FIGURE 4, the plates 46 and 50 on the left-hand side are provided with a pair of ways 142 and 143 and on the right-hand side are provided with similar ways 144 and 145. Disposed on the left-hand ways 143 and 142 is a slide 146 and on the right-hand ways 144 and 145 is a similar slide 150. The slides 146 and 150 are also shown in FIGURE 12. The slides 146 and 150 are adapted to be moved back and forth in the respective ways and the ways are arranged so that the slides move substantially normal to the rotational axis of the spindle. The back and forth motion of the 90° slide 146 is controlled by a piston and cylinder device 151 and the back and forth motion of the 90° slide 150 is controlled by a piston and cylinder device 152.

The piston and cylinder device 151 comprises a cylinder 153 formed in the 90° slide 146 and within which is a piston 154 to which is secured a piston rod 155 fixed to a block 156 secured to the top plate 51. The pistons and cylinder device 152 comprises a cylinder 160 formed in the 90° slide 150 and within which is disposed a piston 161. Secured to the piston 161 is a piston rod 162 which is fixed to the block 163 mounted on the top plate 51.

On the 90° slide 146 there are ways 164 and 165. Similar ways are provided on the 90° slide 150. Within the ways 164 and 165 there is a slide 166 and within the ways on the slide 150 there is a slide 170. The slides 166 and 170 are adapted to be moved back and forth on the ways and the ways are arranged so that this movement is along axes which are respectively at about 60° to the rotational axis of the spindle. The 60° slide 166 is controlled by piston and cylinder device 171 and the movement of the 60° slide 170 is controlled by a piston and cylinder device 172.

The piston and cylinder device 171 includes a cylinder 173 formed in the 60° slide 166 and a piston 174 disposed therein. Secured to the piston 174 is a piston rod 175 which is fixed to a block 176 mounted on the 90° slide 146. The piston and cylinder device 172 includes a cylinder 180 formed in the 60° slide 170, and a piston 181 disposed therein. A piston rod 182 is secured to the piston 181 and is also fixed to a block 183 mounted on the 90° slide 150.

A tracer valve 184 is mounted on an arm 185 fixed to the 90° slide 146. The tracer valve 184 cooperates with a template 186 mounted on the column 12. The tracer valve 184 controls the fluid for the piston and cylinder device 151 and hence controls the movement of the 90° slide 146.

A tracer valve 190 is mounted on an arm 191 fixed to the slide 166. The tracer valve 190 cooperates with a template 192 which is fixed to the colmun 10. The tracer valve 190 controls the fluid for the piston and cylinder device 171 and hence controls the motion of the 60° slide 166. A tracer valve 193 is mounted on an arm 194 which is fixed to the 90° slide 150. The tracer valve cooperates with a template 195 which is fixed to the column 13. The tracer valve 193 controls the fluid for the piston and cylinder device 152 and hence controls the motion of the 90° slide 150. A tracer valve 196 is mounted on an arm 197 which is fixed to the 60° slide 170. The valve 196 cooperates with a template 200 which is fixed to the column 11. The tracer valve 193 controls fluid for the piston and cylinder device 172 and hence controls the motion of the 60° slide 170.

The manner in which the tracer valves 184, 190, 193 and 196 operate to control the motion of the 60° and 90° slides will be explained hereinafter.

Before going on, it is desired to point out another important advantage of the frame or bed structure described heretofore. As mentioned above, the columns 10, 11, 12 and 13 are virtually strain free and, therefore, can serve not only as accurate guiding means for the carriage, but also as means for mounting the various templates. This is important because the contour of the templates control the positions of the 60° and 90° slides during the working operation. Obviously if the templates are moved or distorted, this motion will be sensed by the traced valves and hence move the slides as a function of the distortion or motion. This, of course, will be reflected in the dimensions of the article being formed.

Roller Rests

The rollers are adapted to be mounted on the 60° slides 166 and 170 by the roller rests 201 and 202.

In certain types of flowing operations it is desirable that the plane of the roller face be oriented substantially normal to the rotational axis of the spindle; while in other types of flowing operations it is desirable that the plane of the roller face be substantially parallel the rotational axis of the spindle or work piece. For example, in FIGURE 10 it will be observed that the plane $p$ of the face of the roller $R_1$ is close to being normal to the rotational axis $A'$ of the spindle. The plane $p_1$ of the roller $R_2$ is similarly oriented. In FIGURE 11, however, it will be noted that the planes $p$ and $p_1$ are arranged substantially parallel to the rotational axis of the spindle. The orientation of the rollers in FIGURE 10 is particularly useful in those instances where the contour of the blank to be formed includes a portion which is substantially parallel to the axis of the spindle, for example, in FIGURE 10 the portion of the contour indicated at 203. The orientation of the faces of the rollers in FIGURE 11 is desirable in those instances where the contour of the article to be formed is substantially conical and particularly where the cone has a large included angle.

The construction of the slide and roller rest which permits the roller to be adjusted as mentioned above will be described in connection with FIGURES 8 and 9.

The slide and roller rest structure for adjusting each roller is substantially the same and the description will be only in connection with the roller rest 201 and the 60° slide 166 for the roller $R_1$. The end of the slide 166 is configured in the form of a yoke 204 and within the yoke is disposed the roller rest 201. The yoke has two apertures 205 and 206 which are aligned with an aperture 210 in the roller rest 201. A shaft 211 extends through these apertures and beyond the sides of the yoke where it is fastened by the nuts 212 and 213. The portion of the shaft within the aperture 210 of the roller rest has a pair of keys which fit into appropriate ways in the roller rest. One of these keys and keyways is indicated at 214. The portion of the shaft within the aperture 205 is provided with keyways 215 and 216. Similar keyways are on the portion of the shaft within the aperture 206. These keyways on the shaft are in axial alignment with one another and also in alignment with the keys on the center part of the shaft. Each end of the yoke has pairs of keyways, for example, in FIGURE 8 the pair of ways 220–221 and the pair of ways 222–223. In the position shown the key 224 is shown disposed in the ways 215 and 220 and the key 225 is disposed in the ways 216 and 221. The keys 224 and 225 extend substantially the same axial distance as the aperture 205. Similar keys are in the aperture 206.

With the parts in position as shown in FIGURES 8 and 9, it will be seen that the face of the roller corresponds to the position described in connection with FIGURE 10 or with the face substantially normal to the spindle rotational axis. In this position the rotational axis of the roller is substantially parallel the spindle rotational axis. By removing the nuts 211 and 212, the keys 224 and 225 and the shaft 211, the roller rest 201 may be removed from the yoke. Then, as the rest is inserted so that it is reversed 180° from the position shown (looking along the 60° axis of the slide) and rotated (about 75° clockwise as looking at FIGURE 8), it will be apparent that the rest will occupy the position shown by the dotted lines; i.e., with the roller face substantially parallel the spindle rotational axis and with the roller axis substantially normal the spindle axis. The shaft 211 is inserted by precisely aligning the ways in the central part of the shaft with the ways 222 and 223. Then by placing the keys 224 and 225 in the ways 222 and 223, the shaft and roller rest are fixed in position and locked by screwing down the nuts 212 and 213.

The Tailstock

The function of the tailstock on the instant apparatus is to securely clamp the blank on the spindle, particularly during the working operation. The tailstock is mounted on the carriage and moves therewith. The tailstock is connected with the carriage by a piston and cylinder device which provides for moving the tailstock up and down and also provides a yielding connection so that the carriage can move during the working operation while the tailstock remains fixed against the blank. The concept of a yieldable tailstock is disclosed in my copending application 679,551 and the embodiment of the tailstock disclosed herein makes certain improvements, particularly that the tailstock is demountable from the carriage so as to adapt the machine for the flowing of generally cylindrically-shaped articles.

The tailstock includes a large cup-shaped member 230 (FIGURE 1) which is bolted to the top plate 51 of the carriage as by bolts 231. On top of the cup-shaped member 230 is a piston and cylinder device 232 comprising a cylinder 233 within which is a piston 234. A piston rod 235 carries at its lower end the rotatable head member 236 having a support 237 which extends between the carriage plates 46 and 50 and which cooperates with the vertical guides 239 and 240 on the plates 46 and 50. Thus the head 236 is guided for vertical motion. During the working operation the head 236 clamps the blank on the spindle.

When the machine is to be used for flowing a cylindrical blank, the tailstock assembly including the member 230, piston and cylinder device 232 and head 236 are removed. The assembly may be stored on the brackets 44 and 45. Removal of the tailstock assembly leaves the central portion of the carriage and the area above the carriage in "open" condition. The spindle used in this type of flowing is cylindrically-shaped and a cylindrically-shaped blank is placed thereon. The rollers are made to engage the end of the blank and move downwardly so as to reduce the wall thickness and elongate the side. The formed blank extrudes off the end of the spindle, the extruded portion extending up through the center of the carriage and into the space formerly occupied by the cup-shaped member 230. After the blank has been formed the same may be removed from the spindle up through the machine and out through the U-shaped opening 6.

Stripper and Work Elevator

The invention contemplates a stripper and work elevator which functionally cooperate with one another for the purpose of holding a blank to be placed upon the spindle and also for the purpose of removing a stripped blank from the machine.

The stripper mechanism is somewhat along the lines shown in my copending application 765,878 and includes a stripper ring 240 which surrounds the spindle and is adapted to be moved by the piston and cylinder devices 241 and 242. The piston and cylinder device 241 comprises the cylinder 243 within which is a piston 244 with a piston rod 245 extending up through the cylinder and attached to one side of the ring. The piston and cylinder device 242 comprises the cylinder 246 within which is a piston 250 having a piston rod 251 secured thereto and extending up through the cylinder where it is attached to the stripper ring. From an inspection of FIGURE 3, it will be seen that the piston and cylinder devices 241 and 242 are disposed 180° apart and on opposite sides of the spindle axis A.

The piston and cylinder devices are adapted to move the stripper ring 240 along the axis of the spindle from the position shown in FIGURE 1 up to the nose of the spindle or such that the surface of the stripper is substantially flush with the flat end of the spindle nose.

The work elevator comprises an elevator plate 252 which as seen in FIGURE 3 has an annular section 253 which is disposed closely adjacent the stripper ring 240. The elevator plate is adapted to be moved in a vertical direction by means of the piston and cylinder devices 254 and 255. The piston and cylinder device 254 comprises the cylinder 256 within which is a piston 260 having a rod 261 which extends up to the cylinder where it is attached to the elevator plate. The piston and cylinder device 255 comprises a cylinder 262 in which is a piston 263 having a rod 264 which extends up to the cylinder where it is attached to the elevator plate. From an inspection of FIGURE 3 it will be seen that the piston and cylinder devices 254 and 255 are symmetrically disposed on opposite sides of the spindle axis.

The stripper and elevator are used as follows. Both the stripper and elevator are moved up so that their top surfaces are substantially flush with the small end of the spindle, a blank being loaded on the elevator prior to such movement. With the stripper and elevator in this position the blank is merely pushed from the elevator over onto the stripper and then centered with respect to the axis of the spindle. After the tailstock has gripped the blank and fixedly holds the same against the spindle, both the work elevator and stripper are moved downwardly to the position shown in FIGURE 1. Another blank to be worked may then be loaded on the elevator so that the same is all ready to be used as soon as the working operation has been completed.

After the working operation is completed the stripper moves upwardly and in doing so engages the large end of the worked blank and strips the same from the spindle. The worked blank may then be removed from the stripper, for example, through the space between the columns 10 and 12 and then the blank on the elevator can be pushed over onto the stripper.

*Hydraulic Circuits*

The manner in which the various components of the apparatus are operated will be explained in connection with FIGURES 12 and 13.

As mentioned heretofore, the 90° slides 146 and 150 and the 60° slides 166 and 170 are all tracer controlled. The tracer mechanisms for each of the slides are identical and, therefore, the operation of these will be explained only in connection with the tracer for the 60° slide 166. This is diagrammatically shown in FIGURE 13.

The tracer valve 190 is similar to the valve shown in copending application 765,878 and includes a pair of interconnected lands 300 and 301 which are adapted to be moved back and forth in accordance with the engagement and disengagement of the stylus 302 with the template 192. The back and forth movement of the spool connects and disconnects the port 303 with the ports 304 and 305. The port 303 is connected to the chamber 306 of the cylinder 173 by the line 310. The port 304 is connected to a line 311 which runs to a line 312 going to reservoir 313. The port 305 is connected by a line 314 to the valve V-1 which is operated by solenoid SOL-1. The other chamber 315 of the cylinder 173 is connected by a line 316 to a pump P-1. The line 320 also connects the pump P-1 to the valve V-1.

When the solenoid SOL-1 is de-energized, the valve V-1 interconnects the lines 312 and 314 and line 320 is dead-ended. When the solenoid SOL-1 is energized, the valve V-1 connects the lines 314 and 320.

The spool 300 is shown in the position wherein the stylus 302 is undeflected and assuming that the solenoid SOL-1 has been energized, it will be seen that the fluid from the pump P-1 goes through the line 320, the valve V-1 to the line 314 and through the tracer valve 190 to the line 310 to the chamber 306. Also, fluid from the pump P-1 goes through the line 316 to the chamber 315. The same unit pressure exists in the chambers 306 and 315. However, the pressure area on the piston 174 in chamber 306 is greater than the pressure area in chamber 315. Therefore, the cylinder 173 and 60° slide 166 is moved inwardly. This inward motion continues until such time as the stylus 302 contacts the template 192 which then moves the spool so that the land 301 closes the port 305 and the land 300 opens the port 304. This connects chamber 306 to reservoir via line 310, tracer valve 190, line 311 and line 312. Fluid from the pump P-1 continues to flow into the chamber 315 and, therefore, the cylinder 173 and the 60° slide 166 are moved outwardly.

When the solenoid SOL-1 is de-energized, the line 320 is dead-ended by the valve V-1 and the lines 312 and 314 are interconnected. Fluid from the pump P-1 flows through the line 316 to the chamber 315. The chamber 306 is connected to reservoir via the line 310, port 303 and port 305 in the tracer valve 190, line 314, valve V-1 to line 312. Under these conditions, therefore, the cylinder 173 and the 60° slide 166 are moved outwardly.

Under the normal conditions of operation of the machine the motor (not shown) driving the pump P-1 is turned on and the solenoid SOL-1 is de-energized so that the 60° slide 166 assumes a position outwardly or toward the rotational axis of the spindle. During the working operation, of course, the solenoid SOL-1 is energized so that the slide moves in toward the spindle axis and the tracer controls the motion of the slide in a manner as has been explained above. The other 60° slide 170 and the two 90° slides are similarly operated.

It will be recalled that the carriage has a two-part drive, the piston and cylinder devices 85 and 86 controlling the motion of the carriage from and to the position of the carriage at the start of the working operation, the piston and cylinder devices 126 and 130 operating to pull the carriage along the axis of the spindle during the working operation and then, when the working operation is completed, to push the carriage back to its position at the start of the working operation.

The piston and cylinder devices 85 and 86 are controlled by a valve V-3 operated by solenoids SOL-2 and SOL-3.

In cylinder 90 the lower chamber 321 is connected by a line 322 to the valve V-3 and the upper chamber 323 is connected by a line 324 to the valve V-3. In cylinder 93 the lower chamber 325 is connected by a line 326 which in turn is connected to the line 322 running to the valve V-3. The upper chamber 330 is connected by a line 331 to the line 324 running to the valve V-3. A line 332 runs from the valve V-3 to the reservoir 333 and a line 334 connects the valve V-3 to the pump P-2.

When solenoids SOL-2 and SOL-3 are de-energized, the valve V-3 dead-ends the line 322 and interconnects the line 334 to the drain line 332 so that the pump, if operating, merely pumps fluid through valve to reservoir. With line 322 dead-ended the fluid in the lower chamber 321 of the cylinder 90 and the lower chamber 325 of the cylinder 93 is trapped. Thus, if the pistons 91 and 94 are all the way at the top of the cylinders, they will remain in this position. Obviously, if the pistons are in the position shown, or all the way down, they will also remain in this position.

When solenoid SOL-2 is energized, the pistons 91 and 94, hence the rods 92 and 95 connected thereto, are moved up. When the solenoid SOL-3 is energized, the pistons and rods are moved down.

When solenoid SOL-2 is energized, the valve V-3 interconnects the lines 324 and 332 and also interconnects the lines 322 and 334. It will be seen, therefore, that fluid from the pump P–2 can flow through lines 334, valve V–3, line 322 to the lower chamber 321 in cylinder 90 and also from line 322 to the line 326 to the lower chamber 325 in cylinder 93. The fluid in upper chamber 323 can move outwardly through line 324, valve V–3 and line 332 to reservoir. Fluid in the upper champer 330 can move outwardly through line 321 to line 324 through the valve V–3 to the reservoir line 332. The piston rods 92 and 95 move upwardly.

When solenoid SOL–3 is energized, the valve V–3 interconnects the lines 324 and 334 and also interconnects the lines 322 and 332. Under these conditions it will be seen that the fluid from the pump P–2 can flow through the line 334, valve V–3, line 324 to upper chamber 323 in cylinder 90 and also from the line 324 through the line 331 to the upper chamber 330 in cylinder 93. Fluid in the lower chamber 321 of the cylinder 90 can flow outwardly through the line 322, valve V–3, and line 332 to reservoir. Fluid in the lower chamber 325 of the cylinder 93 can flow outwardly through line 326 to line 322, valve V–3 to line 332 to reservoir. The piston rods 92 and 95 move downwardly.

The piston and cylinder devices 126 and 130 are controlled by a valve V–4 which is operated by the solenoids SOL–4 and SOL–5. The fluid controlled by the valve V–4 is supplied by the pump P–3, the discharge side of which is connected to a line 334 connected to a line 335 running to the valve V–4. A line 336 running from the valve V–4 is connected to a line 340 going to reservoir 341. In cylinder 131 the lower chamber 342 is connected to a line 343 which in turn is connected to a line 344 which runs to the valve V–4. In the line 344, is a flow control valve 345 and a counter-balance valve 346. Also in cylinder 131 the upper chamber 350 is connected by a line 351 to a line 352 running to valve V–4. The line 352 has a flow control valve 353. In cylinder 132 the lower chamber 354 is connected to the line 344 running to the valve V–4. The upper chamber 355 is connected to a line 356 which is connected to the line 352 running to the valve V–4. The flow control valves are for controlling the rate of carriage movement.

When the solenoids SOL–4 and SOL–5 are de-energized, the line 344 is dead-ended by the valve V–4 and the lines 335 and 336 are interconnected. This condition locks the pistons 133 and 134 in position similarly as explained in connection with the pistons 91 and 94.

When solenoid SOL–4 is energized, the pistons 133 and 134, hence the rods 135 and 136 move upwardly. When the solenoid SOL–5 is energized, the pistons 133 and 134 and their rods 135 and 136 are moved downwardly.

When solenoid SOL–4 is energized, the valve V–3 interconnects the lines 335 and 344 and also interconnects the lines 336 and 352. Under these conditions fluid from the pump P–3 can flow through the line 334, line 335, valve V–4, line 344 to the lower chamber 342 of the cylinder 131 and also to the lower chamber 354 of the cylinder 132. Fluid in the upper chamber 350 of the cylinder 131 can flow out through the line 351, line 352, valve V–4, line 336 and line 340 to reservoir. Fluid in the upper chamber 352 of the cylinder 132 can flow out through the line 356, line 352, valve V–4, line 336 and line 340 to reservoir. Under these conditions it will be seen, therefore, that the pistons 133 and 134 and their rods 135 and 136 are moved upwardly.

When the solenoid SOL–5 is energized, the valve V–4 interconnects the lines 335 and 352 and the lines 336 and 344. Under these conditions, therefore, it will be seen that fluid from the pump P–3 can flow through the line 334, line 335, valve V–4, line 352 and line 351 to upper chamber 350 in the cylinder 13. Also, the fluid in the line 352 goes through the line 356 to the upper chamber 355 in the cylinder 132. Fluid in the lower chamber 342 of the cylinder 131 can flow out through the line 343, line 344, valve V–4, line 336 to reservoir line 340. Also, the fluid in the lower chamber 354 of the cylinder 132 can flow out through the line 344 and thence to reservoir. The piston rods 135 and 136 are move downwardly.

When the upper pistons 92 and 95 and the lower pistons 135 and 136 are in the position shown in FIGURE 12, the various locking devices 96 and 100, 140 and 141 are adapted to be actuated for locking and unlocking the pistons with the carriage. The upper locking devices 95 and 101 are controlled by a valve V–5 and the lower locking devices 140 and 141 are controlled by a valve V–6.

As has been mentioned heretofore, each of the locking devices are identical in construction and operation. Incidentally, it might be observed that the position of the locking devices as shown in FIGURE 12 is reversed 90° from the actual position as shown in FIGURES 1 and 3. This has been done simply for the sake of clarity.

The devices 116 and 120 are of the simple double acting piston type. When fluid is flowing into the line 360 and out of the line 361, the device 116 operates so that its locking member 114 engages the rod 92. With regard to the piston device 120, when fluid is flowing into the line 362 (which is commonly connected to line 360) and out of the line 363 (which is commonly connected to the line 361) the locking member 115 moves inwardly to engage the rod 92. Under these conditions the rod 92 is locked to the carriage. When the fluid flow is reversed to the devices 116 and 120, the locking members 114 and 115 move outwardly to unlock the rod 92 from the carriage.

It will be observed that the valve V–5 has a line 364 which is connected to the lines 360 and 363. Also, the valve has a line 365 which is connected to the lines 361 and 362. The line 366 connects the valve V–1 to the reservoir 370 and a line 371 connects a discharge side of the pump P–4 to the valve V–5. The valve V–5 is operated by the solenoids SOL–6 and SOL–7. When the solenoid SOL–6 is operated, the devices 96 and 100 are operated so as to lock the carriage and the rods 92 and 95. When the solenoid SOL–7 is operated the devices 96 and 100 are operated so as to unlock the carriage and the rods 92 and 95.

When lock solenoid SOL–6 is energized the valve V–5 interconnects the lines 371 and 364 and also interconnects the lines 366 and 365. Under these conditions it will be seen that fluid from the pump P–4 can flow through the line 371, valve V–5, line 364 to the lines 360 and 363. Fluid also flows to the lines 360′ and 363′ of the piston and cylinder devices 116′ and 120′. Fluid flows from the devices 116, 120, 116′ and 120′ via lines 361, 362, 361′ 362′, valve V–5 and line 366 to reservoir. The devices 96 and 100 operate so as to lock the carriage and rods 92 and 95. When the solenoid SOL–7 is energized, the valve V–5 interconnects lines 371 and 365 and also interconnects the lines 366 and 364. Under these conditions it will be seen that the flow of fluid to the locking devices 96 and 100 is reversed so that the devices unlock the carriage and rods 92 and 95.

When both solenoids SOL–6 and SOL–7 are de-energized, the line 364 is dead-ended by the valve V–5 and the lines 371 and 366 are interconnected so that fluid from the pump P–4, if it is operating, merely flows through the valve to reservoir. With the blocking of the line 364 it will be apparent that the locking devices are immobilized whether in the locking or unlocking condition.

The locking devices 140 and 141 are controlled by the valve V–6 which is operated by the solenoids SOL–8 and SOL–9. The valve V–6 and the solenoids SOL–8 and SOL–9 control the locking devices 140 and 141 similarly as explained above. When solenoid SOL–8 is energized, the locking devices 140 and 141 are operated to lock the carriage and rods 135 and 136 and when the solenoid SOL–9 is energized, the devices 140 and 141 are actuated so as to unlock the rods 135 and 136 and the carriage. When both the solenoids SOL–8 and SOL–9 are de-energized, the devices 140 and 141 are immobilized.

It will be recalled that the stripper mechanism is controlled by the piston and cylinder devices 241 and 242 and the manner in which these operate will be explained following.

The piston and cylinder devices 241 and 242 are controlled by a valve V–7 which is actuated by solenoids SOL–10 and SOL–11. With regard to the piston and cylinder device 241, it will be noted that the upper chamber 372 is connected to a line 373 which in turn is connected to a line 374 going to the valve V–7. The lower chamber 375 is connected to a line 376 which in turn is connected to a line 380 going to the valve V–7. With respect to the piston and cylinder device 242, the upper chamber 381 is connected to the line 373. The lower chamber 382 is connected to the line 376.

When solenoid SOL–10 is energized, the piston and cylinder devices are activated so that the stripper mechanism moves up and when the solenoid SOL–11 is energized, the piston and cylinder devices are activated so that the stripper moves down.

When solenoid SOL–10 is energized, the valve V–7 interconnects the lines 334 and 380 and also interconnects the lines 340 and 374. Under these conditions it will be seen that fluid from the pump P–3 can flow through the line 334, valve V–7, line 380 to line 376 and thence to the lower chambers 375 and 382. Fluid from the upper chambers 372 and 381 can flow outwardly via the line 373, line 374, valve V–7 and line 340 to reservoir. The pistons 244 and 250, hence the stripper, are moved up.

When solenoid SOL–11 is energized, the valve V–7 interconnects the lines 344 and 374 and the lines 340 and 380. Under these conditions fluid from the pump P–3 can flow through the line 334, valve V–7, line 374, line 373 to the upper chambers 372 and 381. Fluid in the lower chambers can flow outwardly through the line 376, line 380, valve V–7 and line 340 to reservoir. The pistons 244 and 250, hence the stripper, are moved down.

When both the solenoids SOL–10 and SOL–11 are de-energized, the valve V–7 dead-ends the line 380 and interconnects the lines 334 and 340 so that fluid from pump P–3 going through line 334 to valve V–7 flows back to reservoir. The dead-ended line 380 immobilizes the devices 241 and 242.

The elevator mechanism is controlled by the piston and cylinder devices 254 and 255 which are controlled by the valve V–8 which is actuated by the solenoids SOL–12 and SOL–13. With respect to the left-hand device 254, it will be noted that the upper chamber 383 is connected to a line 384 which is connected to a line 385 running to the valve V–8. The lower chamber 386 is connected to a line 390 which in turn is connected to a line 391 running to the valve V–8. As to the right-hand piston and cylinder device 255, the upper chamber 392 is connected to the line 384 and the lower chamber 393 is connected to the line 390. It will be noted that the valve V–8 is connected by the line 335 to the pump P–3 and also connected by the line 336 to the reservoir line 340.

When the solenoid SOL–12 is energized, the valve V–8 causes the piston and cylinder devices 254 and 255 to be activated to move the work elevator upwards and when the solenoid SOL–13 is energized, the valve V–8 activates the piston and cylinder devices 254 and 255 to cause the elevator to move down.

When the solenoid SOL–12 is energized, the valve V–8 interconnects the lines 335 and 391 and also interconnects the lines 336 and 385. Under these conditions fluid from the pump P–3 flows through the line 335, the valve V–8, line 391 to the line 390 and thence to the lower chambers 386 and 393. Fluid in the upper chambers 383 and 392 flows outwardly through the line 384, line 385, valve V–8, line 336 to the reservoir line 340. The pistons 260 and 263, hence the elevator, move up.

When the solenoid SOL–13 is energized, the valve V–8 interconnects the lines 335 and 385 and lines 336 and 391. Under these conditions fluid from the pump P–3 flows through the line 335, valve V–8, line 385, line 384 to the top chambers 383 and 392. Fluid in the bottom chambers 386 and 393 flows outwardly through the line 390, line 391, valve V–8, line 336 to reservoir line 340. The pistons 260 and 263, hence the elevator, moves down.

It will be recalled that the tailstock is controlled by the piston and cylinder device 232. The piston and cylinder device is actuated by the valve V–12 controlled by the solenoids SOL–17 and SOL–18. The upper chamber 400 of the device 232 is connected by a line 401 to the valve V–12. The line 401 includes a variable resistance valve 402. The lower chamber 403 is connected by a line 404 to the valve V–12. The valve V–12 is also connected by a line 405 to the pump P–6 and by a line 406 to the reservoir 410. When the solenoid SOL–17 is energized, the tailstock is moved up and when the solenoid SOL–18 is energized, the tailstock is moved down.

When the solenoid SOL–17 is energized, the valve V–12 interconnects the lines 405 and 404 and also interconnects the lines 406 and 401. Under these conditions fluid from the pump P–6 flows through the line 405, valve V–12, line 404, to the lower chamber 403. Fluid in the upper chamber 400 flows outwardly through the line 401 and resistance valve 402, valve V–12 to the reservoir line 406. The piston 234 and tailstock move up.

It will be observed that the above-described upward motion of the piston 234 and tailstock is the same as if the tailstock and piston were engaged with a blank on the spindle and the cylinder 233 moved down with the carriage. This latter condition exists during a working operation. The amount of force exerted by the tailstock on the blank may be controlled by the valve 402 which controls the rate at which fluid is metered out of the upper chamber 400.

When the solenoid SOL–13 is energized, the valve V–12 interconnects the lines 405 and 401 and also interconnects the lines 406 and 404. Under these conditions fluid from the pump P–6 flows through the line 405, valve V–12, line 401 and resistance valve 402 to the upper chamber 400. Fluid in the lower chamber 403 flows outwardly through the line 404, valve V–12 to reservoir line 406. The piston 234 and tailstock move down.

The tailstock may be immobilized in its down or up position by de-energizing both the solenoids SOL–17 and SOL–18 so that the valve V–12 dead-ends the line 404 and connects line 405 to reservoir line 406.

Before proceeding it is pointed out that the tracer valve 184 for the 90° slide 146 cooperates with the valve V–9 controlled by the solenoid SOL–14. The valve V–9 receives fluid from the pump P–1. The tracer valve 193 for the 90° slide 150 cooperates with the valve V–10 which is controlled by the solenoid SOL–15. The valve receives fluid from the pump P–5. The tracer valve 196 for the 60° slide 170 cooperates with the valve V–11 which is controlled by the solenoid SOL–16. The valve V–11 receives fluid from the pump P–5.

In the foregoing description it will be observed that I have not gone into the details of the exact manner in which the various solenoids are energized and de-energized nor the manner in which the motor for driving the spindle and the various motors for driving the pumps are energized. It is felt unnecessary to do this since conventional control circuits are used and the necessary arrangements are perfectly apparent to those skilled in the art. In any event, the control circuit for the spindle motor may include conventional starter and conventional clutch and brake mechanisms. A typical arrangement is shown in my copending application 765,878.

With regard to the various motors for operating the pump, these may be connected across a common power source and energized and de-energized either in unison or selectively depending upon the arrangement of the relays and the control contacts.

The various solenoids are adapted to be energized and de-energized through contacts controlled by relays, the relays in turn being energized and de-energized through manual or automatically operating switches. Typical arrangements of solenoids, relays and control switches are shown in copending application 765,878.

*Preferred Sequence of Operation*

In the following description it will be presumed that electrical circuits for controlling the various solenoids are in ready condition for operation and that the various pump motors have been turned on.

First a blank to be worked is placed on the work elevator and then the elevator and stripper are raised to the up position, the control for these elements being effective by operating the solenoids SOL–10 and SOL–12. The work piece is then pushed over onto the stripper so that it is in the desired alignment with the rotational axis of the spindle.

For loading and unloading blanks in the machine it is preferred that the carriage is in its upmost position so that there is a clear space between the top of the spindle and the rollers. This distance is substantially equal to the total length of the spindle. As will be apparent, the carriage is maintained in its upmost position by virtue of the fact that the locking devices 96 and 100 have been actuated to interlock the carriage and rods 92 and 95 and that the solenoids SOL–2 and SOL–3 have been de-energized so that the piston and cylinder devices 85 and 86 maintain the carriage in its upmost position. Also, it is preferred that the 60° and 90° slides be in the out position. This is done by de-energizing the solenoids SOL–1, SOL–14, SOL–15 and SOL–16.

The solenoid SOL–3 is energized so as to start the carriage moving downwardly and when the same has reached its position for the start of the working operation (FIGURES 1 and 12), the carriage is stopped by de-energizing the solenoid SOL–3. The start position is determined either by the operator or by a limit switch which de-energizes the solenoid SOL–3.

The tailstock is energized so that it moves down to clamp the blank. This may be done by energizing the solenoid SOL–18. When the tailstock has clamped the blank, the solenoid SOL–18 is de-energized.

The rods 135 and 136 are raised and interlocked with the carriage. The raising of the rods is done by energizing the solenoid SOL–4. In raising the rods it is presumed of course that the locking devices 140 and 141 are in the unlocked condition and when the rods 135 and 136 have interengaged with the locking devices 140 and 141, the solenoid SOL–8 is energized so that the devices 140 and 141 operate to interlock the carriage and the rods. Then the solenoid SOL–8 is de-energized so that the locking devices are immobilized. At this time then the solenoid SOL–7 is energized so as to cause the locking devices 96 and 100 to be operated so as to uncouple the carriage from the rods 92 and 95. The solenoid SOL–7 is then de-energized so as to immobilize the devices 96 and 100 in unlocked condition.

After the foregoing has taken place, the work elevator and stripper are moved down and this control may be effected by energizing the solenoids SOL–11 and SOL–13.

The 60° and 90° slides mounting the rollers R₁ and R₂ are now moved in toward the axis of the spindle. This is done by energizing the solenoids SOL–1, SOL–14, SOL–15 and SOL–16. The rollers continue to move in until the styli of the valves 184, 190, 193 and 196 respectively contact the templates 186, 192, 195 and 200. The rollers are now in contact with the blank and ready to start the flowing operation. The 60° and 90° slides are under the control of the tracers during the working operation.

The spindle motor 43 is now energized to start the spindle rotating with the gear box being adjusted so that the spindle rotates at the desired speed. To start the working operation or the movement of the rollers over the surface of the spindle to flow the blank, the carriage is moved down.

This is done by energizing the solenoid SOL–5 which causes the piston and cylinder devices 126 and 130 to be activated to draw the rods 135–136 and the carriage downwardly. As the carriage moves downwardly the tracer valves 184 and 193 controlling the 90° slides 146 and 147 engage the templates 186 and 195 and control the slides in a manner dictated by the contour of the templates. Also, the tracer valves 190 and 196 for the 60° slides 171 and 172 contact the templates 192 and 200 and control the motion of the 60° slides in a manner as dictated by the contour of the templates.

When the blank has been worked, for example, when it has been formed as shown at *a* in FIGURE 1, the carriage feed is stopped and this may be done by de-energizing the solenoid SOL–5. The end of the working operation may be under the control of the operator or under the control of a limit switch. At this time the spindle rotation is stopped.

The solenoids SOL–1, SOL–14, SOL–15 and SOL–16 are de-energized so that the 90° and 60° slides move to the outmost position. The carriage is then moved up to the position it assumes at the start of the working operation and this may be effected by energizing the solenoid SOL–4. When the carriage has attained its start position the solenoid SOL–4 is de-energized. Then the tailstock is moved upwardly and this may be accomplished by energizing the solenoid SOL–17.

The solenoid SOL–6 is energized so as to cause the locking devices 96 and 100 to interlock the rods 92 and 100 to interlock the rods 92 and 95 with the carriage and after this has been done, the solenoid SOL–9 is energized to cause the locking devices 140 and 141 to unlock the carriage and rods 135 and 136.

The carriage is now in condition to be moved to its upmost position and this may be effected by energizing the solenoid SOL–2. When the carriage has reached its upmost position it is maintained therein simply by de-energizing the solenoid SOL–2.

After the carriage has been started up, the pistons 135 and 136 may be moved downwardly by energizing the solenoid SOL–5. At this time then the formed blank is ready to be stripped from the spindle and this may be done by energizing the solenoid SOL–10 which moves upwardly to engage the blank and move the same off the spindle in a manner as heretofore mentioned. Also, the elevator mechanism is moved up so that the blank loaded thereon is ready to be put on the spindle. When the stripper has reached its upmost position the formed article may be removed from the machine. The blank then is moved from the elevator over onto the stripper and positioned as desired with respect to the rotational axis of the spindle and the machine is then operated as described above.

The concept of mounting a roller on two independently movable and controlled slides is an important part of the invention, particularly from the standpoint of providing for a maximum of support for the roller without undesirable deflection or distortion of the slides or supporting means and/or the means to move the slides. Furthermore, this arrangement provides for highly significant improvements in the accuracy of which the rollers are controlled during the working operation.

The support aspect is particularly important, especially in those instances where the article to be formed is considerably larger at one end than the other, for example, a cone having a small end diameter in the order of 2″ to 3″ and a large end diameter in the order of 80″. My arrangement of double slides provides for adequate roller support regardless of the difference in diameter between the large and small end of a cone (or any other shaped object). This is so because with the double slides the amount of roller overhang is reduced to an absolute minimum. For example, in FIGURE 10 it will be observed that the 90° slides 146 and 150 have been moved inwardly toward the axis of the spindle. Under these conditions it will be noted that the amount of overhang of the roller or roller rest from the slides is about equal to the radius of the roller. As the rollers have traversed along the spindle, say to the second position, it will be observed that both the 90° slides and the 60° slides have moved somewhat outwardly and that the amount of roller overhang is substantially the same as in the first position. When the rollers have reached the third position shown it will be observed that there is no overhang between the rollers and the slides.

While in the present embodiment I have shown one slide to be oriented at substantially 90° to the axis and the other slide to be oriented substantially at 60° it will be at once apparent that the support feature may be gained where the slides are supported at different angles. I prefer, however, the arrangement of the 90° and acute angle slides because the acute angle slide gives certain advantages, particularly from the standpoint of thrust absorption as pointed out in copending application 765,878 and for reasons pointed out below.

The slide arrangement has very significant advantages from the standpoint of providing for improvements in tracing characteristics; i.e., controlling the roller during the working operation. For example, with the dual slides I can obtain nearly uniform feed of the rollers over the desired contour. This is important from the standpoint of obtaining maximum quality of the work piece surfaces and for obtaining uniform cross section in the wall. Furthermore, the dual slides are important from the standpoint of accurately controlling the position of the roller with respect to the spindle surface which is an absolute essential in obtaining wall thickness within the desired tolerances. As an example of uniform feed rate, reference may be had to FIGURE 10 where it will be seen that the article to be formed has an elliptical shape. It is extremely difficult with a roller supported upon a 90° slide to perfectly generate the small part of the ellipse because the 90° slide must move out at a very rapid rate. The combined movement of the 90° and 60° slides outwardly permits the actual resultant motion of the roller to have slow uniform feed. Also, when the nuckle or sharply contoured side of the ellipse is being generated (the area 203), the motion of the slides gives the desired feed rate to the roller. Thus, by properly designing the templates which control the 90° and 60° slides, the desired and/or uniform feed rates can be obtained for almost any imaginable shape.

The dual slide arrangement is particularly advantageous for a flowing operation where the two rollers are off-set; i.e., one roller is ahead of the other in a direction toward the spindle. For example, in flowing certain dome-like articles, better results are obtained in working some parts of the article where one roller is off-set and tends to spin or lay down the metal ahead of the other roller. On other parts of the article it is especially important that the rollers have no off-set. The arrangement of the present invention is ideally suited for such diverse functioning. For example, one roller can be put in off-set condition by merely putting a knob or rise on the 90° template for the area where the off-set condition is desired. When the tracer valve hits the knob, the 90° slide will move out. However, the 60° tracer valve will tend to follow its own template and move the 60° slide in. Thus the roller will assume an off-set position. A knob can also be put on the 60° template so that the roller will not only be off-set but also be spaced more radially outward than its companion roller.

I claim:
1. In a machine tool:
a frame;
a spindle rotatably mounted on said frame, the spindle being for mounting a blank to be worked;
a carriage mounted on said frame for movement in a direction along the rotational axis of said spindle;
means for moving said carriage during a working operation;
a first slide;
means mounting said first slide on said carriage for rectilinear movement relative to the carriage along a path oriented at an angle to said rotational axis;
means connected between said carriage and said first slide for moving the first slide along said path when the carriage is moving during the working operation;
a second slide;
a roller mounted on said second slide, the roller being for working a blank on the spindle;
means mounting said second slide on said first slide for rectilinear movement relative to the first slide along a second path oriented at an angle to said rotational axis different from first said angle; and
means connected between said first slide and said second slide for moving the second slide along said second path when the carriage is moving during a working operation, the relative motion between the spindle, the carriage and the first and second slides defining a path of motion for the roller during a working operation.

2. In a machine tool:
a rotatable spindle for mounting a blank to be worked;
a roller for engaging and working a blank on a spindle;
means interconnecting said roller and said spindle to provide for relative motion between the roller and the spindle including components of motion in directions along and transverse the rotational axis of the spindle;
the means providing for relative motion in a direction transverse said rotational axis including a pair of slides slidably engaged with one another, one slide being mounted for rectilinear movement along a path oriented at an angle to said axis and said other slide being mounted on said one slide for rectilinear movement relative to said one slide along a path oriented at an angle to said axis different from said first said angle, said other slide carrying said roller;
the means providing for relative motion in a direction along said rotational axis including mechanism connected between said spindle and said one slide; and
means for moving said slides relative to each other respectively along said paths during a working operation and during the time when said means providing for relative motion along said axis is operating, said components of motion defining a path of motion for the roller during the working operation.

3. In a machine tool:
a rotatable spindle for mounting a blank to be worked;
a roller for engaging and working a blank on the spindle;
a first slide mounted for rectilinear movement relative to the spindle along a path oriented at an angle to the rotational axis of said spindle;
means for moving said first slide along said path during a working operation;
a second slide mounted on said first slide for rectilinear movement relative to the first slide along a second path oriented at an angle to said rotational axis different from first said angle, said roller being mounted on said second slide;
means connected between said first slide and said second slide for moving the second slide along said second path during a working operation;
mechanism mounting said first slide to provide for its rectilinear movement and interconnecting said first slide and said spindle and operative to provide a component of relative motion between the slides and the spindle in a direction along said rotational axis, the relative motion between said spindle and said first and second slides defining a path of motion for the roller during a working operation.

4. In a machine tool:
a frame;
a spindle rotatably mounted on said frame, the spindle being for mounting a blank to be worked;
a roller for working the blank;
first slide means movable along a path to provide a component of motion along the rotational axis of the spindle;
second slide means mounted on said first slide and movable along a path to provide a component of motion transverse said rotational axis;
a roller rest for supporting the roller on said second slide; and
means connecting the roller rest with the second slide and providing alternatively for the rest to be in a first position with the plane of the roller face substantially parallel the rotational axis of a spindle and in the second position with the plane of the roller face substantially normal to the rotational axis of the spindle, said means including mechanism on the second slide and mechanism on the rest operative when the rest is in said first position to provide for the rest to be removable from the second slide and to provide, when the rest is so removed and turned 180° about an axis parallel to the motion of the second slide and also turned about an axis normal to first said turning axis, for the rest to be insertable into the slide with the roller in said second position.

5. In a machine tool:
a frame;
a spindle rotatably mounted on said frame, the spindle having a working surface and being for mounting a blank to be worked;
a roller for working a blank on said spindle;
means interconnecting the roller and the spindle and providing for the roller to be moved over the working surface of the spindle during a working operation, said mechanism including a slide means movable along a path oriented transversely to the rotational axis of the spindle;
a roller rest mounting said roller on said slide;
means connecting the roller rest with the slide and providing alternatively for the rest to be in a first position with the plane of the roller face substantially parallel the rotational axis of a spindle and in the second position with the plane of the roller face substantially normal to the rotational axis of the spindle, said means including mechanism on the slide and mechanism on the rest operative when the rest is in said first position to provide for the rest to be removable from the second slide and to provide, when the rest is so removed and turned 180° about an axis parallel to the motion path of the second slide and also turned about an axis normal to first said turning axis, for the rest to be insertable into the slide with the roller in said second position.

6. In a machine tool:
a frame including first and second end supports;
a spindle rotatably mounted on the first of said supports, the spindle being for mounting a blank to be worked;
a carriage mounted on said frame for movement in a direction along the rotational axis of the spindle;
a slide mounted on said carriage for movement in a direction transverse said axis;
a roller mounted on said slide, the roller being for working the blank;
mechanism for moving the carriage toward said spindle to axially position the roller at the start of the working operation and to move the carriage away from the spindle after the working operation, said mechanism including first piston and cylinder means operatively connectible between the carriage and the second of said supports;
mechanism for moving the carriage during the working operation and to return the carriage to its position at the start of the working operation including second piston and cylinder means operatively connectible between the carriage and the first of said supports; and
mechanism to connect the carriage and said first piston and cylinder means and disconnect the carriage and said second piston and cylinder means and to conect the carriage and said second piston and cylinder means and disconnect the carriage and said first piston and cylinder means.

7. A construction in accordance with claim 6 wherein last said mechanism includes a plurality of fluid-actuated locks mounted on said carriage and respectively arranged to engage and grip said pistons.

8. In a machine tool:
first and second end supports;
a spindle rotatably mounted on said first support;
four square columns interconnecting said supports and symmetrically spaced about the rotational axis of the spindle;
an intermediate structural member connected to two of said columns and to said first support;
guiding means formed on said intermediate member and on its connected columns;
a roller-supporting carriage mounted on said guide means; and
mechanism to move said carriage comprising first piston and cylinder means mounted on said first support and second piston and cylinder means mounted on said second support, together with a plurality of locks mounted on said carriage and respectively arranged alternatively to engage and grip the first piston means or the second piston means.

9. In a machine tool:
a frame including an end support;
a spindle mounted on said end support, the spindle being for mounting a blank to be worked;
a carriage mounted on said frame for movement in a direction along the rotational axis of the spindle;
roller means mounted on said carriage for movement in a direction transverse said axis, the roller being for working the blank;
mechanism for moving the carriage toward said spindle to axially position the carriage for the working operation and to move the carriage away from the spindle after the working operation, said mechanism including first piston and cylinder means operatively connectible between the carriage and said frame;
mechanism for moving the carriage during the working operation and to return the carriage to said position including second piston and cylinder means operatively connectible between the carriage and said end support; and
mechanism to connect the carriage and said first piston and cylinder means and disconnect the carriage and said second piston and cylinder means and to connect the carriage and said second piston and cylinder means and disconnect the carriage and said first piston and cylinder means.

10. In a machine tool:
a frame including an end support;
a spindle mounted on said end support, the spindle being for mounting a blank to be worked;
a carriage mounted on said frame for movement in a direction along the rotational axis of said spindle, the carriage being constructed with a pair of side plates extending parallel to and disposed on opposite sides of said axis together with means extending between and rigidly interconnecting the plates;

a pair of roller supports respectively disposed on opposite sides of said axis, each support being mounted between said side plates for movement in a direction transverse said axis;

mechanism for moving the carirage toward said spindle to axially position the carriage for the working operation and to move the carriage away from the spindle after the working operation, said mechanism including first piston and cylinder means operatively connectible between the carriage and said frame;

mechanism for moving the carriage during the working operation and to return the carriage to said position including second piston and cylinder means operatively connectible between the carriage and said end support; and mechanism to connect the carriage and said first piston and cylinder means and disconnect the carriage and said second piston and cylinder means and to connect the carriage and said second piston and cylinder means and disconnect the carriage and said first piston and cylinder means.

11. In a machine tool:

a frame including first and second end supports;

a spindle rotatably mounted on the first of said supports, the spindle being for mounting a blank to be worked;

a carriage mounted on said frame for movement in a direction along the rotational axis of the spindle;

a slide mounted on said carriage for movement in a direction transverse said axis;

a roller mounted on said slide, the roller being for working the blank;

first drive mechanism for moving the carriage toward said spindle to axially position the roller at the start of the working operation and to move the carriage away from the spindle after the working operation;

second drive mechanism for moving the carriage during the working operation and to return the carriage to its position at the start of the working operation including piston and cylinder means operatively connectible between the carriage and the first of said supports; and means on said carriage to connect the carriage and the first drive mechanism and disconnect the carirage and the second drive mechanism and to connect the carriage and the second drive mechanism and disconnect the carriage and the first drive mechanism.

12. In a machine tool:

a frame;

a spindle rotatably mounted on said frame, the spindle being for mounting a blank to be worked;

a carriage mounted on said frame for movement in a direction along the rotational axis of said spindle;

a first slide;

means mounting said first slide on said carriage for rectilinear movement along a path oriented at a 90° angle to said rotational axis during the time the carriage is moving;

a second slide;

a roller mounted on said second slide, the roller being for working a blank on the spindle; and means mounting said second slide on said first slide for rectilinear movement along a path oriented at a 60° angle to said rotational axis during the time the carriage is moving, and the relative motion of the carriage and slides defining a path of motion for the roller during a working operation.

13. In a machine tool:

a frame;

a spindle rotatably mounted on said frame, the spindle being for mounting a blank to be worked;

a carriage mounted on said frame for movement in a direction along the rotational axis of said spindle;

a first slide;

means mounting said first slide on said carriage for rectilinear movement along a path oriented at an angle to said rotational axis during the time the carriage is moving;

a second slide;

a roller mounted on said second slide, the roller being for working a blank on the spindle;

means mounting said second slide on said first slide for rectilinear movement along a path oriented at an angle to said rotational axis different from first said angle during the time the carriage is moving, and the relative motion of the carriage and slides defining a path of motion for the roller during a working operation; and independently operable tracer mechanisms for controlling said first and second slides, each tracer mechanism including a templet fixed on said frame and a tracer valve on the slide cooperating with the templet.

14. In a machine tool:

a rotatable spindle for mounting a blank to be worked;

a roller for engaging and working a blank on the spindle;

a first slide mounted for rectilinear movement along a path oriented at 90° angle to the rotational axis of said spindle;

a second slide mounted on said first slide for rectilinear movement along a path oriented at a 60° angle to said rotational axis, said roller being mounted on said second slide;

means interconnecting said slides and said spindle and operative to provide a component of relative motion between the roller and the spindle in a direction along said axis; and control means for moving said first and second slides relative to each other respectively along said paths when said means is operative, the components of motion provided by said slides and said means defining a path of motion for the roller during a working operation.

15. In a machine tool:

a frame;

a spindle rotatably mounted on said frame, the spindle being for mounting a blank to be worked;

a carriage mounted on said frame for movement in a direction along the rotational axis of the spindle;

mechanism for moving said carriage;

a first pair of slides respectively disposed on opposite sides of said axis and each slide being mounted on said carriage for rectilinear movement along a path oriented at an angle to said rotational axis, each path being at the same angle to said rotational axis;

first control means for moving said first pair of slides while the carriage is moving;

a second pair of slides respectively disposed on said first pair of slides on opposite sides of said axis, each second slide being mounted for rectilinear movement along a path oriented at an acute angle to said axis, the two acute angles being equal;

second control means for moving said second pair of slides while the carriage is moving; and a pair of rollers mounted respectively on said second pair of slides, the motion of the carriage and the motion of the respective pairs of slides defining a path of motion for each roller during a working operation.

16. In a machine tool:

a frame;

a spindle rotatably mounted on said frame, the spindle being for mounting a blank to be worked;

a carriage mounted on said frame for movement in a direction along the rotational axis of the spindle, the carriage being constructed with a pair of side plates extending parallel to and disposed on opposite sides of said axis together with means extending between and rigidly interconnecting the plates;

mechanism for moving said carriage;
a first pair of slides respectively disposed on opposite sides of said axis, each slide being mounted on said carriage between said side plates for rectilinear movement along a path oriented at a 90° angle to said rotational axis;
first control means for moving said first pair of slides while the carriage is moving;
a second pair of slides respectively disposed on said first pair of slides on opposite sides of said axis and between said side plates, each second slide being mounted for rectilinear movement along a path oriented at an acute angle to said axis;
second control means for moving said second pair of slides while the carriage is moving; and
a pair of rollers mounted respectively on said second pair of slides, the motion of the carriage and the motion of the respective pairs of slides defining a path of motion for each roller during a working operation.

17. In a machine tool:
first and second end supports;
a spindle rotatably mounted on first said end support;
a plurality of rectangular-shaped columns interconnecting said end supports;
an intermediate structural member connected to two of said columns and to said first end support;
a carriage movably mounted on said columns and said intermediate member for movement in a direction along the rotational axis of the spindle;
mechanism for moving said carriage;
a first pair of slides respectively disposed on opposite sides of said rotational axis and each mounted on said carriage for rectilinear movement along a path oriented at an angle to said axis;
first control means for moving said first pair of slides including a tracer mechanism for each slide, each tracer mechanism having a templet fixed on a column;
a second pair of slides respectively disposed on said first slides and each mounted for rectilinear motion along a path oriented at an acute angle to said axis; and
second control means for moving said second pair of slides including a tracer mechanism for each slide, each tracer mechanism having a templet fixed on a column.

18. In a machine tool:
first and second end supports;
a spindle rotatably mounted on first said end support;
a plurality of columns interconnecting said end supports;
a carriage movably mounted on said columns for movement in a direction along the rotational axis of the spindle;
mechanism for moving said carriage;
a first pair of slides respectively disposed on opposite sides of said rotational axis and each mounted on said carriage for rectilinear movement along a path oriented at an angle to said axis;
first control means for moving said first pair of slides while the carriage is moving, the first control means including a tracer mechanism for each slide;
a second pair of slides respectively disposed on said first slides and each mounted for rectilinear motion along a path oriented at an angle to said axis different from first said angle;
second control means for moving said second pair of slides while the carriage is moving, the first control means including a tracer mechanism for each slide; and
a pair of rollers mounted respectively on said second pair of slides, the motion of the carriage and the motion of the respective pairs of slides defining a path of motion for each roller during a working operation.

19. In a machine tool:
a base;
a crown, the crown being formed with an aperture;
a spindle rotatably mounted on said base substantially co-axial with said aperture;
support means connecting the base and crown;
guide means on said support means;
a roller for working the blank on said spindle;
carriage means mounting said roller, the carriage means being connected with said guide means and being formed with an aperture substantially co-axial with first said aperture;
mechanism to move said carriage on said guide means, the direction of motion being generally along the rotational axis of the spindle; and
a tailstock including piston and cylinder means removably mounted on said carriage, the piston means being co-axial with the rotational axis of the spindle and extending through said carriage aperture and the tailstock being for clamping a blank on the spindle during a working operation and the piston and cylinder means constituting a yielding connection between the carriage and tailstock providing for the tailstock to remain fixed against the blank while the carriage moves for the working operation, said crown aperture being dimensioned so that the tailstock is movable therethrough when the same is removed from the carriage and with said tailstock removed said crown and carriage apertures providing axially extending openings through which a cylindrically-shaped blank can be inserted on or removed from the spindle and openings through which a cylindrically-shaped blank being worked by the roller can extrude away from the spindle.

References Cited in the file of this patent
UNITED STATES PATENTS

| Re. 3,996 | Hayden | May 24, 1870 |
| 376,167 | Seymour | Jan. 10, 1888 |
| 2,624,303 | Ghormley | Jan. 6, 1953 |
| 2,624,304 | Ghormley | Jan. 6, 1953 |
| 2,902,963 | Roberts | Sept. 8, 1959 |
| 2,975,743 | Hoffman et al. | Mar. 21, 1961 |

FOREIGN PATENTS

| 743,053 | Great Britain | Feb. 22, 1956 |